United States Patent [19]

Yamagata et al.

[11] Patent Number: 4,872,066
[45] Date of Patent: Oct. 3, 1989

[54] DROP-OUT CORRECTION APPARATUS

[75] Inventors: Shigeo Yamagata; Masahiro Takei; Tadashi Takayama, all of Kanagawa; Kazuhiko Ito, Tokyo, all of Japan

[73] Assignee: Canon Kabushiki Kaisha, Tokyo, Japan

[21] Appl. No.: 173,825

[22] Filed: Mar. 28, 1988

[30] Foreign Application Priority Data

Apr. 8, 1987 [JP] Japan .................................. 62-86147
Apr. 8, 1987 [JP] Japan .................................. 62-86148

[51] Int. Cl.[4] ............................................... H04N 5/76
[52] U.S. Cl. ................................................... 358/336
[58] Field of Search ................ 358/314, 336; 360/38.1

[56] References Cited

U.S. PATENT DOCUMENTS 4,206,440  6/1980  Dio et al. ........................ 360/38.1 X

Primary Examiner—Robert L. Richardson
Attorney, Agent, or Firm—Robin, Blecker, Daley & Driscoll

[57] ABSTRACT

A signal processing device detects information drop-out parts of an incoming information signal by dividing the information signal received for a given period of time into an n number (n: an integer which is at least 2) of blocks and by forming an information drop-out part signal indicating a part that has an information drop-out within each of the blocks. The device is thus arranged to be capable of promptly finding the parts of the information signal having information drop-outs.

15 Claims, 14 Drawing Sheets

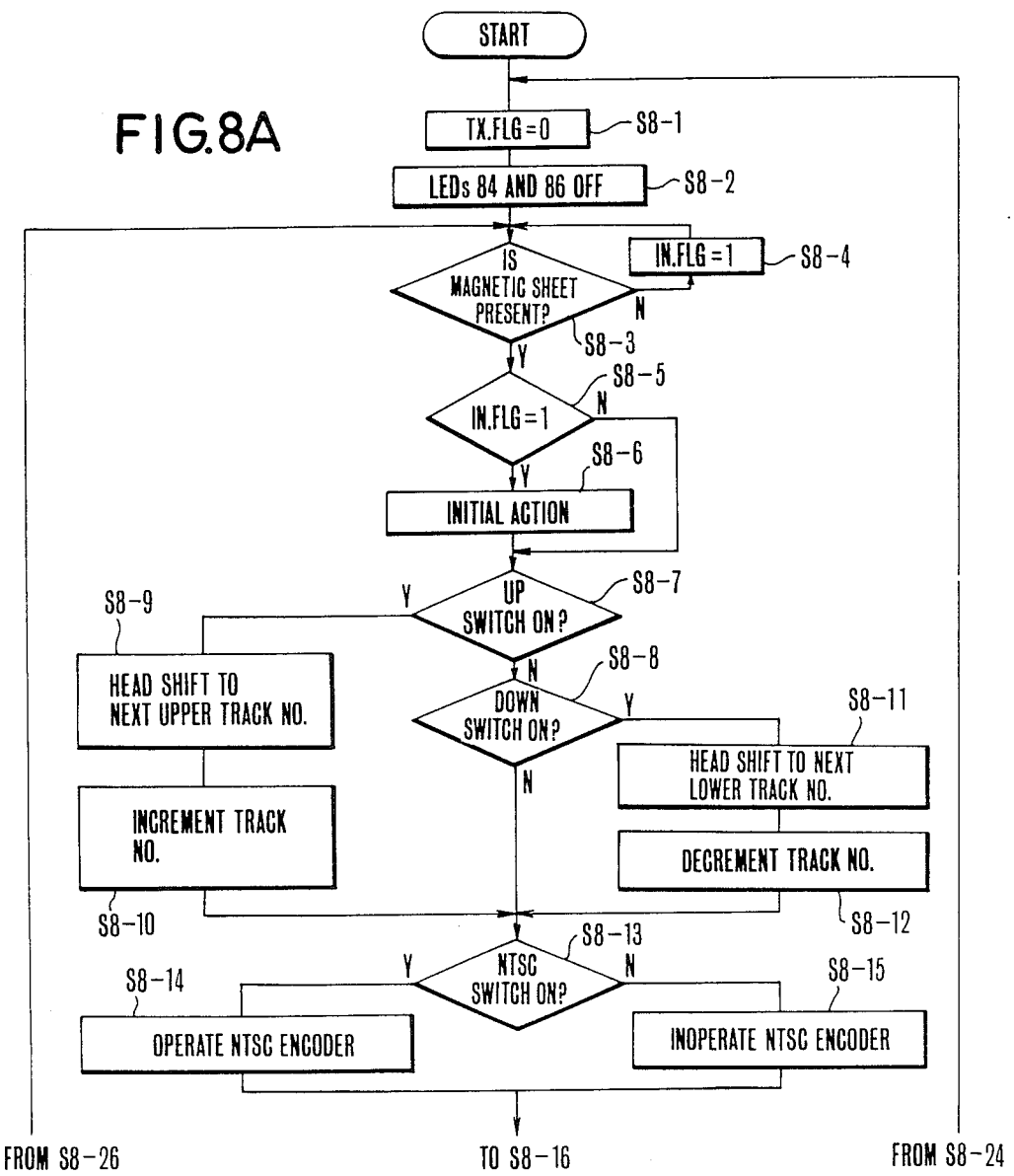

MEMORY M0

MEMORY M1

# DROP-OUT CORRECTION APPARATUS

BACKGROUND OF THE INVENTION

This invention relates to a signal processing device for processing signals.

1. Description of the Related Art

Devices for recording and reproducing, as necessary, image signals on and from magnetic tapes, magnetic discs, optical discs, etc. have become popular. Meanwhile, arrangements have been proposed for transmitting image signals reproduced by such devices to remote places or to other devices for varied purposes.

The image transmission system to be used for such purposes tends to have a drop-out of the signal being transmitted in each of different transmission stages including a transmitting system, a transmission line and a receiving system. It is, therefore, necessary to keep the transmitted signal at a high degree of quality by minimizing the drop-outs of the signal.

However, a reproduction circuit, particularly a reproducing head part thereof, which is included in the transmitting system often has fine dust causing signal drop-outs depending on the environment in which it operates. As a result, compared with an image signal recorded on a recording medium, an image signal temporarily stored at a frame memory or field memory which is employed as a buffer memory for transmission tends to have a greater amount of drop-out. In view of this, there has been developed contrived a method of confirming the contents of the buffer memory through a display made by a monitor device. This method however, necessitates use of a monitor device which must be above a certain quality level. The method is thus not desirable in terms of simplification and reduction in weight of the system. Besides, with the recording image quality increased, the observation of the display by human sight comes to a drop-out confirmable limit.

This problem not only exists in the above stated image transmission system but also generally exists in signal processing systems arranged to store image signals in memories.

SUMMARY OF THE INVENTION

It is a general object of this invention to solve the above stated problem of the prior art with a simple arrangement.

It is a more specific object of the invention to provide an information signal transmission system which is arranged to be capable of accurately transmitting an information signal reproduced from a recording medium by promptly finding the drop-out parts of the signal and by transmitting signal having few drop-out parts.

Under this object, a system arranged according to this invention as an embodiment thereof to reproduce from a recording medium an information signal recorded on the medium and to output the reproduced information signal to a transmission line comprises: reproducing means for reproducing from the recording medium the information signal recorded on the medium; information drop-out detecting means for detecting occurrence or nonoccurrence of an information drop-out in the information signal reproduced by the reproducing means; information signal forming means arranged to divide the information signal reproduced for a given period of time by the reproducing means into an n number (n: an integer which is at least 2) of blocks and, in case of detection by the drop-out detecting means of the occurrence of information drop-out in the information signal of the given period, to form an information drop-out number indicating signal indicative of a number of blocks in which the information drop-out has occurred among the n number of blocks; holding means for holding the information signal reproduced by the reproducing means; and control means for controlling the information signal holding action of the holding means on the basis of the information drop-out number indicating signal formed by the information signal forming means.

It is another object of the invention to provide a device which is capable of promptly interpolating an image information signal at a high speed by promptly finding any information drop-out part of the image information signal when the signal is received.

Under that object, a device for processing an image information signal by receiving the signal comprises: information drop-out detecting means for detecting occurrence or nonoccurrence of any information drop-out in the image information signal received; information signal forming means arranged to divide the image information signal received during a given period of time into an n number (n: an integer which is at least 2) of blocks and to form an information drop-out part indicating signal indicative of a block in which an information drop-out has occurred among the n number of blocks when the occurrence of the information drop-out is detected by the information drop-out detecting means; and storing means for storing the information drop-out part indicating signal formed by the information signal forming means together with the image information signal received during the given period of time.

Other objects and features of the invention will become apparent from the following detailed description of embodiments thereof taken in connection with the accompanying drawings.

BRIEF DESCRIPTION OF THE DRAWINGS

FIGS. 8A and 8B are flow charts showing the basic algorithm of a transmission sequence of operation of the still image transmission system of FIG. 6.

DETAILED DESCRIPTION OF THE PREFERRED EMBODIMENTS

Figure 1:
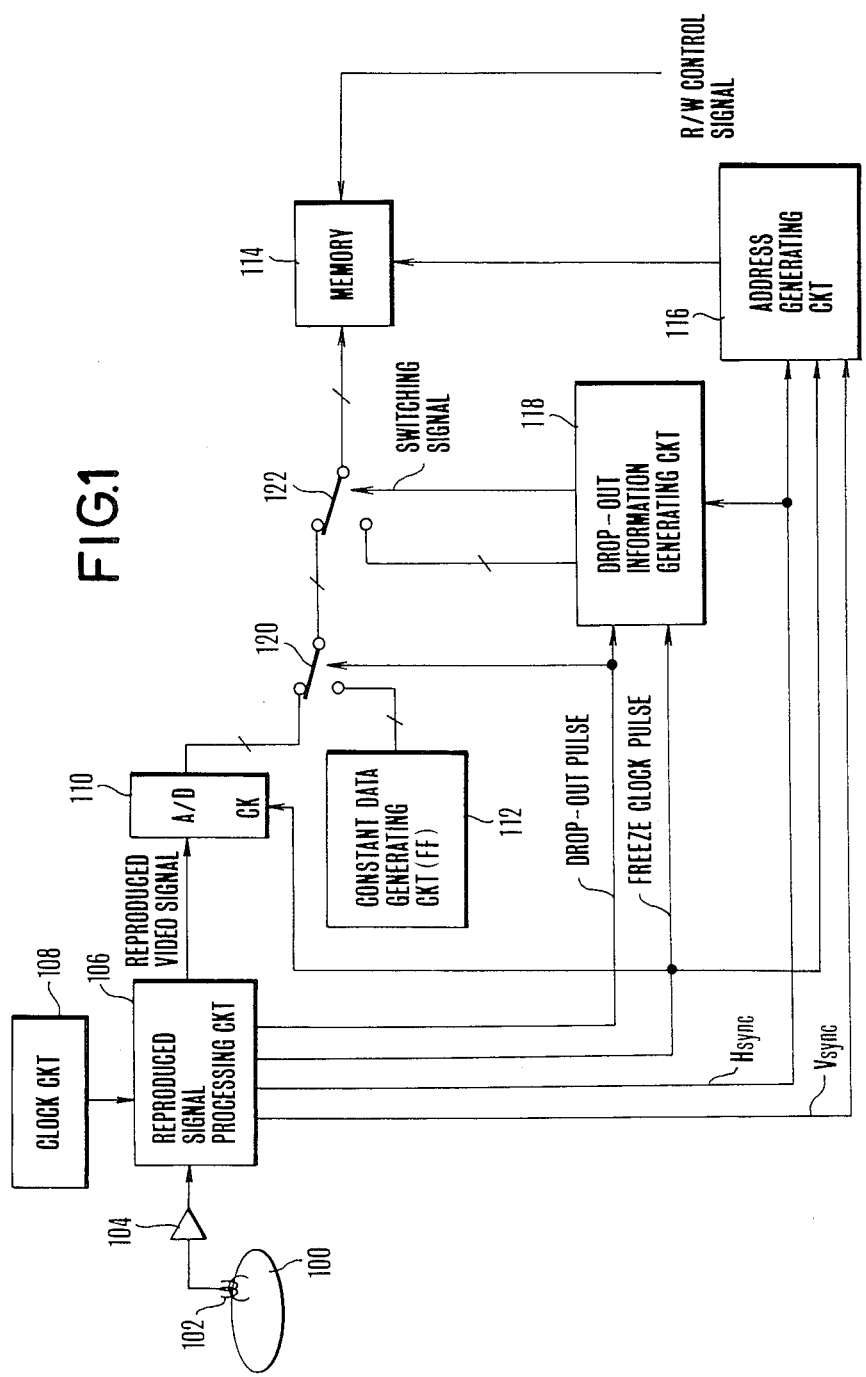
FIG. 1 is a block diagram showing in outline a reproducing apparatus arranged as a first embodiment of this invention.

The following describes the details of this invention on the basis of embodiments thereof:

FIG. 1 shows in outline the arrangement of a first embodiment of this invention. In this case, the invention is applied to a reproducing system for reproducing an image signal recorded on a magnetic sheet. Referring to FIG. 1, an image signal reproduced by a reproducing head 102 from a magnetic sheet 100 is supplied to a reproduced signal processing circuit 106 through a reproduction amplifier 104. The reproduced signal processing circuit 106 is arranged to perform the known signal reproducing processes such as frequency demodulation, a deemphasis process, etc. on the incoming image signal, according to the recorded signal form and the output signal form thereof, and to produce video signals of varied kinds including a luminance signal, color difference signals and the like. However, these video signals will be referred to simply as a reproduced video signal. The reproduced signal processing circuit 106 is provided with a synchronizing signal separation circuit and a drop-out detecting circuit. The circuit 106 is thus arranged to separate from the incoming signal a horizontal synchronizing signal Hsync and a vertical synchronizing signal Vsync; and, for any picture element that has a drop-out, to generate a drop-out pulse. The drop-out detecting circuit is arranged, for example, to detect the drop-out from the envelope of the incoming signal. A clock circuit 108 is arranged to produce reference clock pulses which define the operation timing of the circuit 106.

Figure 2:
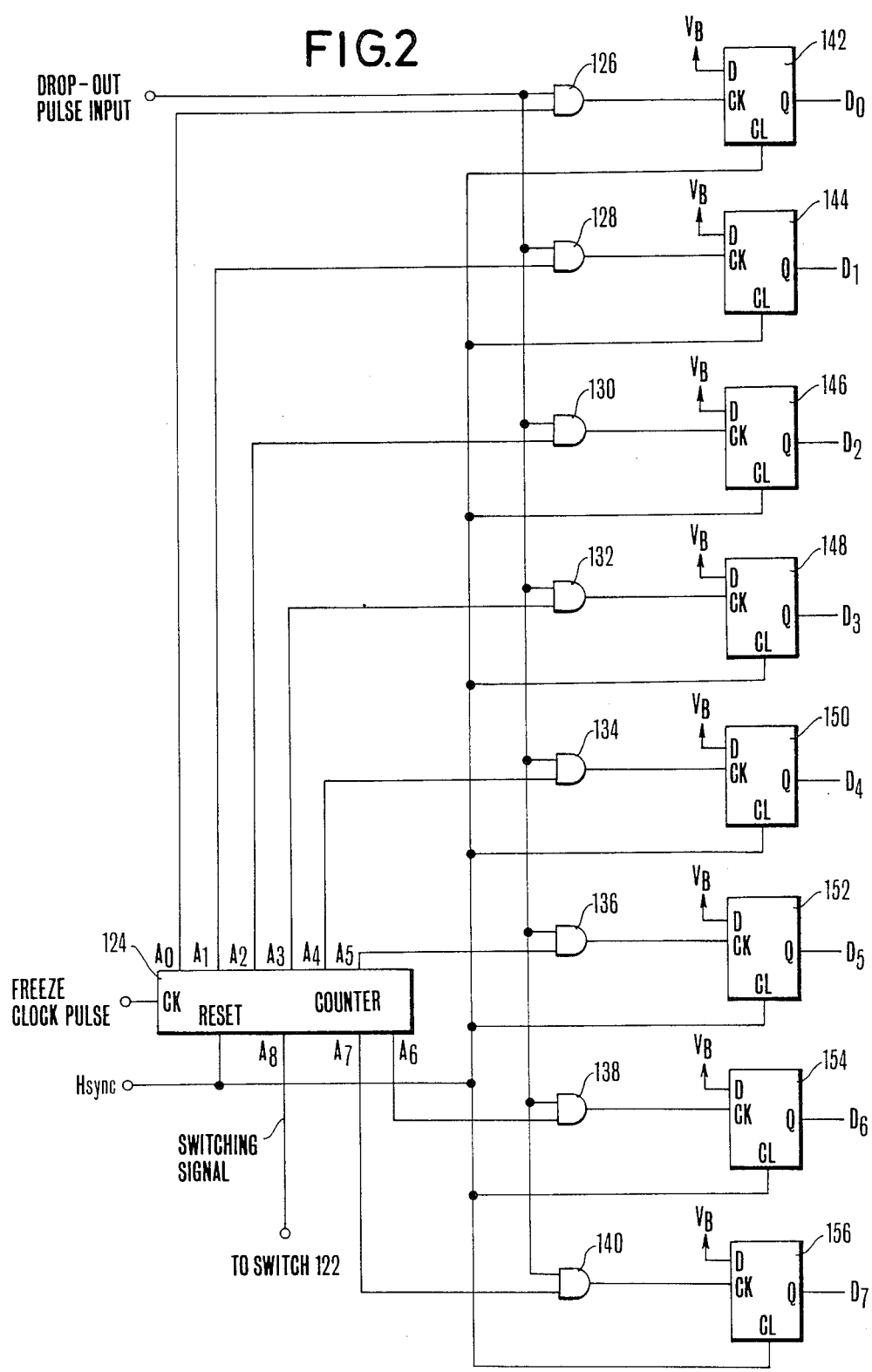
FIG. 2 shows by way of example the arrangement of a drop-out information generating circuit of FIG. 1.
Figure 3:
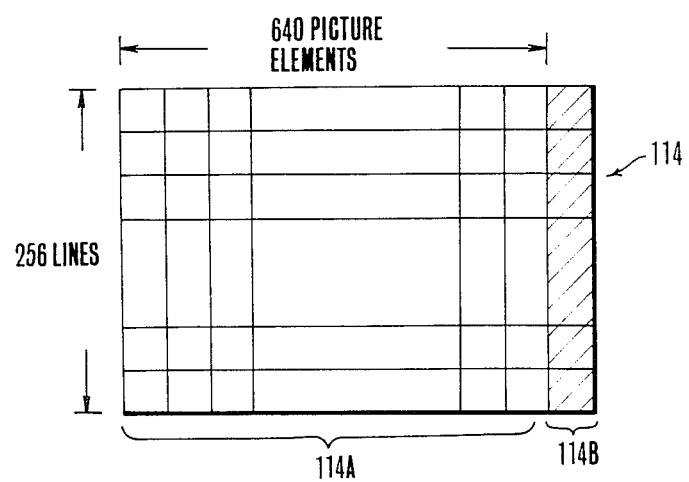
FIG. 3 shows by way of example a video signal and drop-out information allocated within a memory shown in FIG. 1.

An analog-to-digital (A/D) converter 110 is arranged to convert the reproduced video signal which is in an analog signal form into digital video signal data. A constant data generating circuit 112 is arranged to generate specific mark data ("FF" of the hexadecimal notation in this case) for indicating a picture element having a drop-out. A memory 114 is arranged to store a one-field portion (or a one-picture plane portion) of the digital video signal data. Further, in the case of this specific embodiment, the memory 114 consists of 640 picture elements in the horizontal direction and 256 picture elements in the vertical direction as shown in FIG. 3. The memory 114 has an area 114A which is arranged to store the video data and an area 114B which is arranged to store drop-out information for every horizontal line. An address generating circuit 116 is arranged to generate address data for the memory 114. A drop-out information generating circuit 118 is arranged to generate drop-out information for every horizontal line of one picture plane portion of the video signal. FIG. 2 shows by way of example the details of the drop-out information generating circuit 118. A switch 120 is arranged to replace the data of each picture element having the drop-out with the data of the above-stated specific mark data produced from the fixed data generating circuit 112. A switch 122 is arranged to allow the drop-out information on each of horizontal lines to be stored in the drop-out information storing area 114B of the memory 114.

In this specific embodiment, the 640 picture elements aligned in the horizontal direction are divided into eight blocks. Any of these divided blocks that has a drop-out is arranged to be discriminated from other blocks by setting up a flag at a specific one of eight bits D0 to D7. More specifically, eight bits D0 to D7 are assigned to the drop-out information. The least significant bit (LSB) D0 is used if the drop-out takes place among the first to 80th of the 640 picture elements of an applicable line. The bit D1 is used if the drop-out takes place among the 81st to 160th of the picture elements. In this manner, one of the subsequent bits D2 to D7 is used for every 80 subsequent picture elements. Assuming that a bit D3 of the drop-out information storing area 114B is set, for example, this indicates that a drop-out has occurred at any of the 241st to 320th of the picture elements of the applicable line.

The circuit shown in FIG. 1 operates as follows The switches 120 and 122 are normally in their connecting positions t allow the output of the A/D converter 110 to be supplied to the memory 114. The A/D converter 110 A/D converts the reproduced video signal coming from the reproduced signal processing circuit 106 at the timing of a freeze clock pulse. The address data generating circuit 116 then increments a horizontal address value to be supplied to the memory 114 in synchronism with the freeze clock pulse. In this instance, the memory 114 is of course in a state of allowing a writing action. In case that the reproduced video signal has a drop-out, the connecting position of the switch 120 shifts to the side of the constant data generating circuit 112 by a drop-out pulse coming from the reproduced signal processing circuit 106. This causes the constant data generating circuit 112 to supply the specific mark data to the memory 114. Meanwhile, the drop-out pulse is also supplied to the drop-out information generating circuit 118 to have a bit "1" set up in the block including in the horizontal direction the picture element having the drop-out. Upon completion of writing one horizontal line portion (or 640-picture element portion) of the reproduced video signal into the memory 114, the drop-out information generating circuit 118 holds data of one byte (eight bits) indicative of a block having a drop-out in the eight blocks included in the horizontal line. Then, after completion of writing one horizontal line portion of the reproduced video signal into the memory 114, the switch 122 is shifted to its position of connecting the drop-out information generating circuit 118 to allow the drop-out information held at the circuit 118 to be supplied to the memory 114. Then, the address generating circuit 116 produces a horizontal address value which is indicated by a hatched part of FIG. 3. Therefore, the drop-out information produced from the drop-out information generating circuit 118 is stored in the area 114B which is indicated by hatching in FIG. 3. After that, the drop-out information held at the drop-out information generating circuit 118 is cleared in synchronism with the horizontal synchronizing signal Hsync. The position of the switch 122 is then shifted toward the switch 120. As a result, the horizontal address of the address generating circuit 116 is cleared and, at the same time, the vertical address is incremented.

In such a way, video data and drop-out information about all 256 horizontal lines of one picture frame are stored in the memory 114, and then, various treatments such as a drop-out compensation, etc. are effected by utilizing the drop-out information stored in the memory 114, as described later. In addition, the address generating circuit 116 clears the horizontal address and the vertical address in synchronism with the supplied vertical synchronizing signal Vsync.

Referring now to FIG. 2, the details of the drop-out information generating circuit 118 are arranged as follows: A counter 124 is arranged to count the number of freeze clock pulses. The counter 124 produces, at a high level, an output A0 while the counted value thereof is between "0" and "79"; an output A1 while the counted value is between "80" and "159"; an output A2 while the counted value is between "160" and "239"; an output A3 while the counted value is between "240" and "319"; an output A4 while the counted value is between "320" and "399"; an output A5 while the counted value is between "400" and "479"; an output A6 while the counted value is between "480" and "559"; and an output A7 while the counted value is between "560" and "639". When the counted value of the counter 124 reaches "640", the counter 124 produces at a high level another output A8 which is a switching signal to be applied to the switch 122. The outputs A1, A2, A3, A4, A5, A6 and A7 of the counter 124 are applied to the clock input terminals of D flip-flops 142 to 156 (hereinafter referred to as D-FFs) via AND gates 126 to 140 respectively. The AND gates 126 to 140 are arranged to be opened by the drop-out pulse coming from the reproduced signal processing circuit 106. A clock signal is, therefore, applied to any of the D-FFs 142 to 156 that corresponds to any of the eight blocks in the horizontal direction that includes a picture element having a drop-out. In that event, the level of the Q output of such D-FF becomes high. In the case of FIG. 2, the data can be latched at the D-FFs 142 to 156 even in the event of occurrence of drop-out at all the picture elements within the block. For that purpose, each of the D-FFs 142 to 156 is arranged to generate a trigger signal at the rise of the input signal.

When the freeze clock pulse count value of the counter 124 reaches "640," information on the drop-out of the horizontal line is latched at the D-FFs 142 to 156. Then, with the connecting position of the switch 122 changed from the switch 120 over to the output terminals of the D-FFs 142 to 156, the drop-out information is stored in the storing area 114B of the memory 114.

Figure 4:
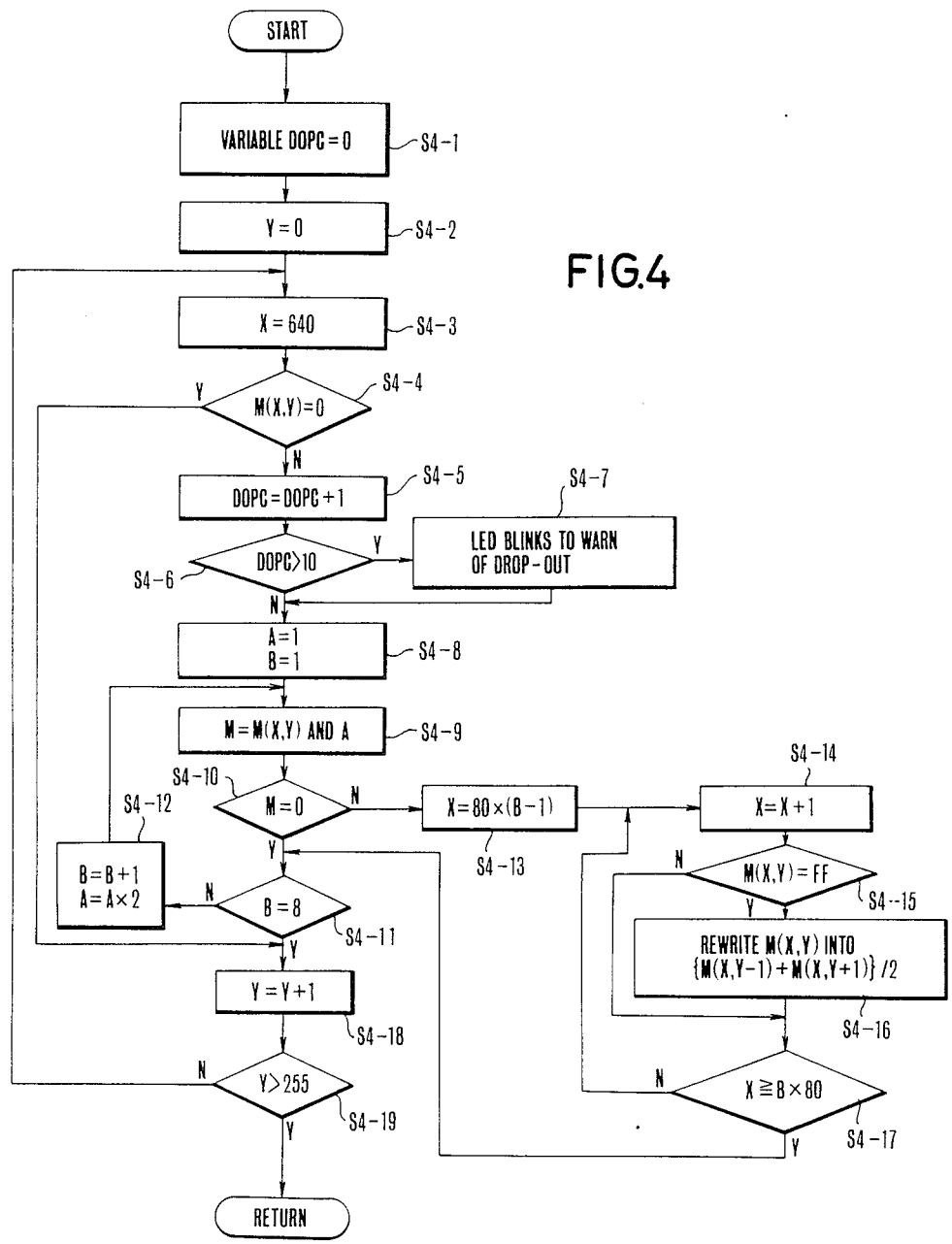
FIG. 4 is a flow chart showing the drop-out compensating operation of the reproducing apparatus of FIG. 1.

The drop-out of the video data of the memory 114 is compensated for in the following manner: Since the compensating operation can be easily carried out by program control, it is arranged to be performed described with reference to the flow chart of FIG. 4. However, the drop-out compensation of course may be carried out by some hardware means. Referring to FIG. 4, a variable DOPC represents a counted number of lines having the drop-out within one picture plane. At steps S4-1 and S4-2: This variable DOPC and another variable Y which represents the vertical position (or an address) of the memory 114 are first set at "0" respectively. At a step S4-3: To find the presence or absence of a drop-out within the line, a horizontal position (address) variable X is set at "640." At a step S4-4: A check is made to find if a memory value M (X, Y) is at "0." If so, the horizontal line is considered to have no drop-out and the flow of operation branches to a step S4-18.

If the memory value (X, Y) is found to be not "0" at the step S4-4, the flow proceeds to a step S4-5. Step S4-5: The variable DOPC is incremented. Steps S4-6 and S4-7: In case that the variable DOPC is at or above a given value ("10" for example), an LED which is not shown is caused, for example, to blink to give a warning indicating some malfunction of the reproducing device or the transmission system. At a next step S4-8: Variables A and B are substituted with "1". At a step S4-9: A logical product is obtained from the memory value M (X, Y) and the variable A. The variable A is provided for the purpose of finding which of the bits of the drop-out information is at a high level and another variable B for the purpose of indicating which of the eight horizontal blocks is being examined. At a step S4-9: If, as a result of the logical product obtaining process, the memory value M is found to be at "0", it indicates that there is no drop-out in the first horizontal block which consists of the picture elements "0" to "79." The flow then proceeds to a step S4-11. If the memory value M is found to be "1," it indicates the presence of a drop-out in the horizontal block. In that event, the flow comes to a step S4-13. Step S4-13: The minimum horizontal position X of the horizontal block is computed. Steps S4-14 and S4-15: After the step S4-13, a check is made to see whether the memory value M (X, Y) is the specific mark data by incrementing the horizontal position (address) variable X by one at a time. At a step S4-16: If the memory value M is found to be the specific mark data, the memory value M is changed to the mean value of data of the upper and lower picture elements. Step S4-17: Upon completion of examination for the data of all the picture elements of the horizontal block, the flow comes to a step S4-11.

At the step S4-11, a check is made to see if the variable B is at "8" thus indicating that the whole of the horizontal block has been examined. If not, the variable B is incremented to have the variable A doubled. The flow then comes back to the step S4-9. If the variable B is found to be "8," the flow comes to a step S4-18 to have the variable Y incremented. At a step S4-19: A check is made to see if the variable Y is above "255." If not, the flow comes back to the step S4-3 to examine a next line. If so, it indicates that all the lines of one picture plane have been examined. Then, the drop-out compensation routine has been completed.

In the case of the embodiment described, a total of eight bits is arranged as an area for storing the drop-out information. The horizontal lines of the video signal are divided into eight blocks. Any of the eight blocks that has a drop-out is discriminated from others by means of the drop-out information signal of eight bits. However, this invention is not limited to this arrangement. The number of bits provided for this purpose may be, for example, two instead of eight or may be more than eight. Further, in the embodiment illustrated, the drop-out information is located logically close to the video data storing area 114A. However, in accordance with the invention, the drop-out information may be located either within another memory or at an address located away from the video data storing area. It goes without saying that the hardware arrangement can be simplified by the adoption of the logical arrangement which is made as shown in FIG. 3.

Figure 5:
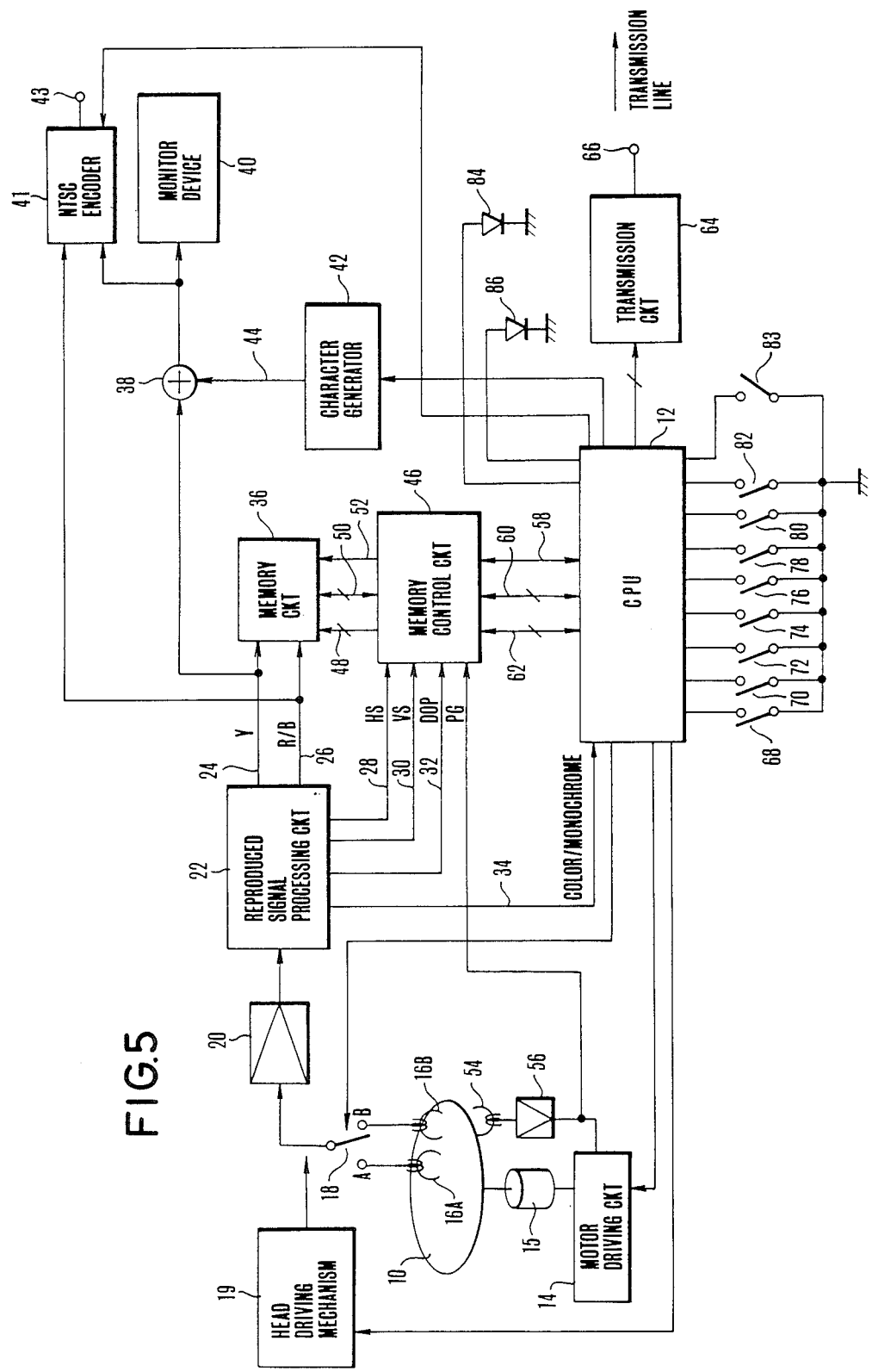
FIG. 5 is a diagram showing in outline an image transmission system arranged according to this invention as a second embodiment thereof.

FIG. 5 shows an example of circuit arrangement of a second embodiment of this invention. In the case of the second embodiment, the invention is applied to a still image transmission system. Referring to FIG. 5, a magnetic sheet 10 has one field portion of a video signal recorded in each of concentric circular recording tracks formed thereon. The embodiment includes a motor driving circuit 14 and a motor 15. The motor driving circuit 14 is arranged to operate under the control of a CPU 12. Reproducing heads 16A and 16B are arranged, for example, to be in-line heads in a known manner. These heads perform either field reproduction or frame reproduction. The use of the reproducing head 16A or 16B is selected by a switch 18 the selecting position of which is changed from one position over to the other by a switching signal from the CPU 12. The output of the switch 18 is arranged to be supplied via a reproduction amplifier 20 to a reproduced signal processing circuit 22. The signal processing circuit 22 is arranged to form a reproduced luminance signal (Y) 24, a line sequential chrominance signal (R/B) 26, a horizontal synchronizing signal (HS) 28, a vertical synchronizing signal (VS) 30, a drop-out pulse (DOP) 32 which is generated according to an envelope deficiency of the reproduced signal, and a signal 34 which indicates whether the reproduced video signal is a color signal or a monochrome signal.

A head driving mechanism 19 is arranged to shift the heads 16A a d 16B to a desired track position on the magnetic sheet 10 in accordance with an instruction from the CPU 12.

With the embodiment arranged as described above, the reproduced luminance signal 24 and the line sequential chrominance signal 26 produced from the reproduced signal processing circuit 22 are temporarily stored by a memory circuit 36. The reproduced luminance signal 24 is also supplied via an adder 38 to a monitor device 40 for the purpose of monitoring. Meanwhile, the adder 38 is arranged to receive a photo pattern signal 44 from a character generator 42 for the purpose of superimposing a display of a track number or the like on the image to be displayed at the monitor device 40. An NTSC encoder 41 is arranged to receive the output of the adder 38 and the line sequential chrominance signal (R/B) 26 from the reproduced signal processing circuit 22 and to produce an NTSC signal to an output terminal 43. A memory control circuit 46 is arranged to control writing and reading actions on the memory circuit 36 in accordance with the horizontal and vertical synchronizing signals 28 and 30 and the drop-out pulse signal 32 which come from the reproduced signal processing circuit 22 and a PG pulse signal which will be described later. The memory control circuit 46 is provided with an address bus 48, a data bus 50 and a control line 52. A magnetized piece which is not shown is secured to the magnetic sheet 10 and is arranged to detect the rotation phase of the sheet 10. A magnetic head 54 is arranged to detect the passing of the magnetized piece and to produce an output which is the above stated PG pulse signal. An amplifier 56 is arranged to amplify the PG pulse signal. The output of the amplifier 56 is fedback to the motor driving circuit 14 and is used for controlling the rotation phase of the magnetic sheet 10.

Further, the memory control circuit 46 is connected to the CPU 12 via a control line 58, a data bus 60 and an address bus 62. The reproduced video signal which is written into the memory 36 from the reproduced signal processing circuit 22 is supplied to the CPU 12 via the data bus 50, the memory control circuit 46 and the data bus 60. The CPU 12 then supplies the video data thus obtained to a transmission circuit 64. Upon receipt of the video data, the transmission circuit 64 converts it through AM, FM processes, etc. into a signal form suited for transmission. The data thus converted is sent out from an output terminal 66.

The CPU 12 is provided with various switches, including: An up switch 68 which is arranged to give an instruction for shifting the reproducing heads 16A and 16B toward a track f a larger track number. A down switch 70 is arranged to give an instruction for shifting the heads toward a track of a smaller track number. A start switch 72 is arranged to give an instruction for starting a transmitting action. A transmission stop switch 74 is arranged for bringing the transmitting action to a pause. Other switches 76, 78 and 80 are arranged to give instructions for selection of a monochromatic field transmission mode, a monochromatic frame transmission mode and a color field transmission mode. One of the switches 76, 78 and 80 is closed according to the transmission mode selected. A switch 82 is provided for selecting a field reproduction mode or a frame reproduction mode. In accordance with the selection made through this switch 82, the CPU 12 causes the switch 18 to be connected either to one of terminals A and B thereof continuously or to connect them alternately for every field. Another switch 83 is arranged to cause the operation of the NTSC encoder 41 to turn on and off.

A light emitting diode 84 (hereinafter referred to as a transmission busy LED) is arranged to make a display indicating that the video data is in the process of being sent out to the transmission line via the transmission circuit 64. A drop out warning LED 86 is the LED which is mentioned in the foregoing with reference to the step S4-7 of FIG. 4.

The operations of the circuit arrangement of the second embodiment shown in FIG. 5 for starting and ending the reproducing head feeding action and the transmitting action are briefly described as follows: When a power supply is switched on, a transmission flag TX.FLG is set at "0". This flag is at "1" during the process of transmission and is at "0" when the video data is not transmitted. The transmission busy LED 84 which is on during the process of transmission is off and the warning LED 86 is also off when the data is not transmitted. A known loading detecting device which is not shown in FIG. 5 is arranged to detect the presence or absence of the magnetic sheet 10. The output of this detecting device is checked to see if the system is loaded with the magnetic sheet 10. If not, an initializing flag IN.FLG is set at "1." When the initializing flag IN.FLG is set, it indicates that the magnetic sheet 10 has been taken out. In that event, therefore, the heads 16A and 16B are repositioned by shifting them first to a datum position which is located either in the innermost part or in the outermost part of the magnetic sheet 10.

The heads 16A and 16B are shifted by the head driving mechanism 19 to a track of a larger or smaller track number accordingly as the up switch 68 or the down switch 70 is operated. Then, the data for the track number which is kept within the CPU 12 is either incremented or decremented as applicable. Then, the second embodiment is in the reproducing mode as selected by the mode selection switch 82. The data for display of the track number of the character generator 42 is renewed for renewal of the track number display of the monitor device the increment or decrement of the track number. Further, the NTSC encoder 41 is rendered operative if the NTSC switch 83 is in an on-state. If not, the encoder 41 is rendered inoperative.

When the transmission start switch 72 is operated, the reproduced signal is written into the memory circuit 36 according to the reproduction mode determined by the reproduction mode switch 82 and the transmission mode determined by the transmission switch 76, 78 or 80. Further, the memory circuit 36 consists of two field memories M0 and M1. Each of them is arranged to have a capacity as shown in FIG. 3. In principle, the luminance signal Y is arranged to be stored by the memory M0 and the luminance signal or the line sequential chrominance signal R/B by the other memory M1. During the process of writing the reproduced signal, the memory circuit 36 and the memory control circuit 46 operate in conjunction with each other to form the drop-out information which has been described in the foregoing with reference to FIG. 1 and to store it in the memory. Then, drop-out compensation is carried out in accordance with the drop-out information.

When reproduction mode switch 82 is in the field reproduction mode selecting position, the luminance signal Y is stored by the memory M0. The line sequential chrominance signal R/B is then stored by the memory M1 only when the transmission mode is in the color field mode (switch 80). However, if the monochromatic frame mode is designated (by the switch 78) while the actual reproduced signal is a monochromatic signal, only one field portion of the luminance signal is stored by the memory M0. Further, the luminance signal Y is alone stored by the memory M0 when the system is set in the color field transmission mode.

After completion of the drop-out compensating operation, the video data stored in the memory circuit 36 is serially sent out via the transmission circuit 64 to the transmission line by carrying out an interrupt process in a manner as determined by the reproduction mode switch 82 and the transmission mode switch 76, 78 or 80. During the process of transmission, the transmission flag TX.FLG is set and the transmission busy LED 84 is on.

When the transmission stop switch 74 is pushed during transmission, the transmission is brought to a stop by inhibiting further interruption for transmission.

In the first and second embodiments, this invention is applied to apparatuses arranged to process image signals. However, the invention is not limited to image signals but is applicable also to apparatuses processing audio signals. These embodiments are capable of promptly carrying out drop-out compensation by speedily finding drop-out parts as mentioned in the foregoing and are, therefore, highly advantageous in reproducing and transmitting high-definition image or video signals having one picture plane composed of many picture elements.

Figure 6:
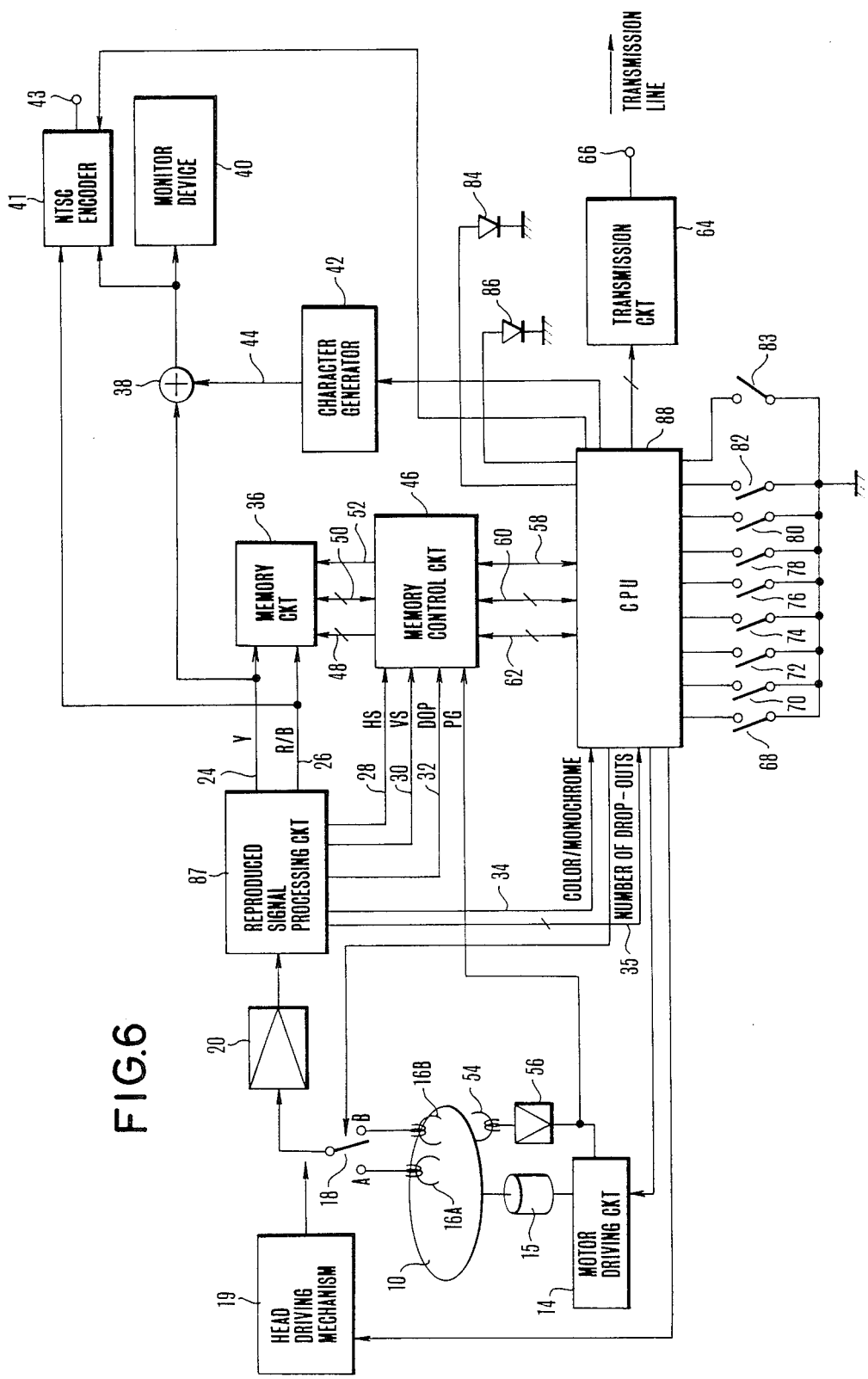
FIG. 6 is a diagram showing in outline a still image transmission system arranged according to the invention as a third embodiment thereof.

FIG. 6 shows in outline a still image transmission system arranged as a third embodiment of this invention. In FIG. 6, the same components as those of the transmission system of FIG. 5 are indicated by the same reference numerals and the details of them are omitted from this description. The still image transmission system of FIG. 6 differs from that of FIG. 5 with respect to a reproduced signal processing circuit 87 and a CPU 88. Therefore, in the following, the circuit 87 and the CPU 88 are mainly described. Like the reproduced signal processing circuit 22 of FIG. 5, the reproduced signal processing circuit 87 of FIG. 6 is arranged to form a reproduced luminance signal (Y) 24, a line sequential chrominance signal (R/B) 26, a horizontal synchronizing signal (HS) 28, a vertical synchronizing signal (VS) 30, a drop-out pulse (DOP) 32, and a signal 34 indicating whether a reproduced video signal is in color or in monochrome. In addition to that, the circuit 87 is arranged to form a signal 35 which indicates the number of drop-outs in the signal recorded on the magnetic sheet 10. The number of drop-outs hereinafter will be referred to as the number of DO or DO number.

The reproduced signal processing circuit 87 monitors the number of DO of the image signal continuously coming from the reproduction amplifier 20 for the same picture plane (more specifically, the number of lines having drop-outs). Then, the DO number signal 35 is supplied to the CPU 88 informing the CPU 88 of the minimum value of the number of DO of the recorded signal. The number of DO may be arranged to be the number of picture elements or areas having drop-outs.

A transmission busy LED 84 is arranged to be continuously on or to blink when the signal is sent out to the transmission line from the transmission circuit 64. A DO warning LED 86 is arranged to blink or be continuously on when the image data stored at the memory circuit 36 has more than a given degree of drop-out.

Figure 7:
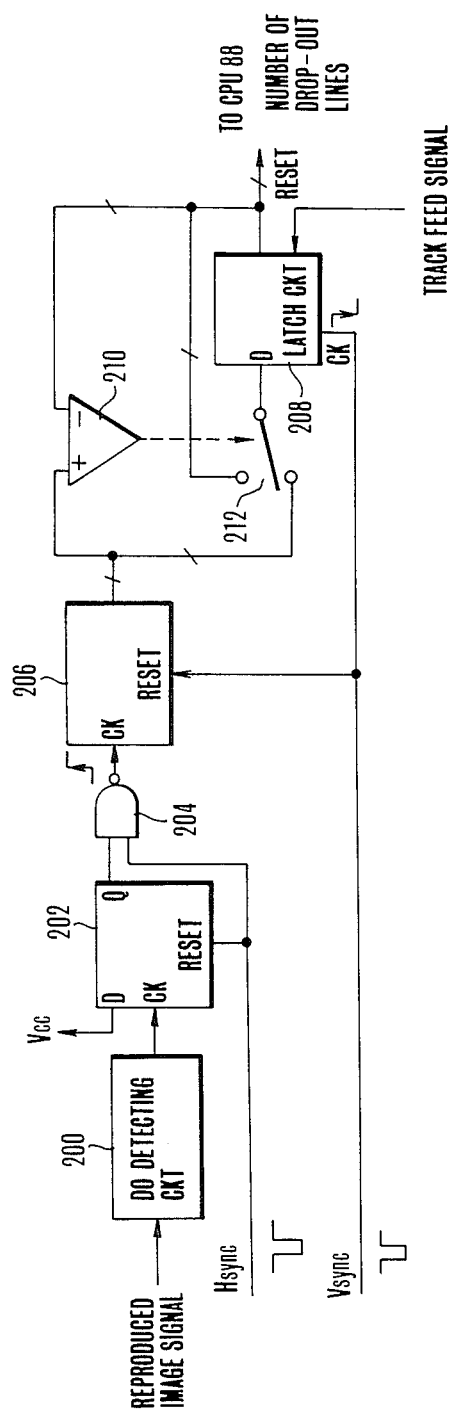
FIG. 7 is a diagram showing by way of example the arrangement of a drop-out number detecting circuit included in a reproduced signal processing circuit shown in FIG. 6.

FIG. 7 shows by way of example the arrangement of a DO number detecting circuit 200 which is included in the reproduced signal processing circuit 87. The DO number detecting circuit 200 is arranged to count the number of lines having drop-outs. Upon detection of occurrence of a drop-out in the reproduced image signal, the DO detecting circuit 200 generates a drop-out pulse. Then, a D flip-flop (D-FF) 202 is rendered operative by the drop-out pulse. The level of the Q output of the D-FF 202 becomes high. This Q output causes a NAND gate 204 to invert and allow horizontal synchronizing pulses Hsync to pass therethrough. The pulses Hsync are applied to the clock input terminal of a counter 206. The counter 206 counts the clock pulse input. At the same time the horizontal synchronizing pulse resets the D flip-flop 202. The counter 206 thus counts the number of lines having the drop-outs the reproduced signal coming from the reproduction amplifier 20.

A latch circuit 208 is arranged to hold the minimum value of the number of drop-outs of the recorded signal reproduced from one and the same track formed on the magnetic sheet 10. The latch circuit 208 is reset in accordance with a track feed signal (or is actually preset at a predetermined value). A comparison circuit 210 is arranged to compare the counted value of the counter 206 with the value held by the latch circuit 208. The output terminal of a switch 212 is connected to the input terminal of the latch circuit 208 if the counted value of the counter 206 is found to be smaller than the held value. Conversely, the output terminal of the latch circuit 208 is connected to its input terminal if the counted value is either equal to or larger than the held value. Vertical synchronizing pulses Vsync are applied to the clock terminal of the latch circuit 208 for an input action. The latch circuit 208 is triggered by the fall of the vertical synchronizing pulse Vsync. Then, the output of the latch circuit 208 is supplied as the DO number signal to the CPU 88.

Figure 8B:
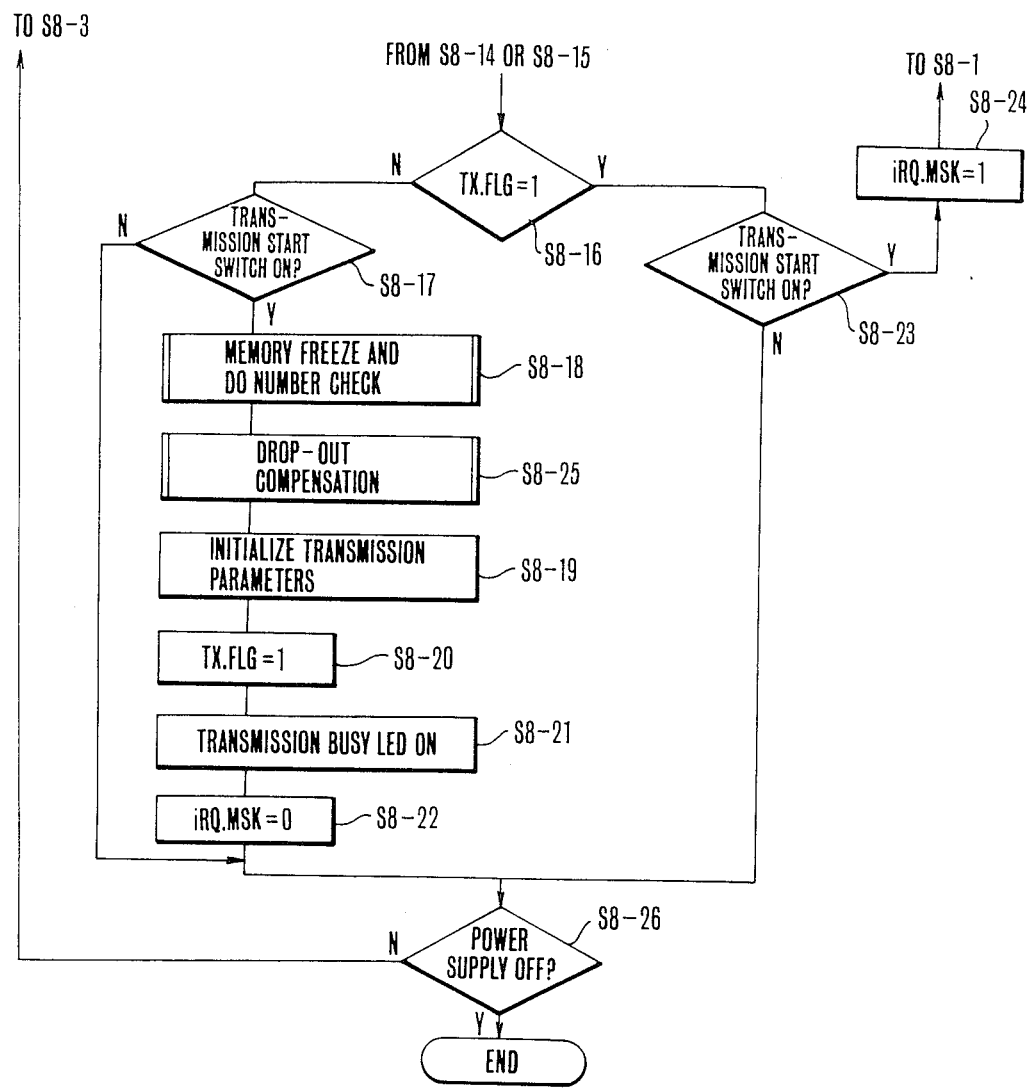

FIGS. 8A and 8B are flow charts showing a routine for starting and ending the head feeding and signal transmitting actions of the still image transmission system arranged as the third embodiment of the invention. Referring to FIGS. 8A and 8B, when a power supply is switched on, a transmission flag TX.FLG is set at "0" and a transmission busy LED 84 and the DO warning LED 86 are extinguished at steps S8-1 and S8-2. The transmission flag TX.FLG is at "1" during the process of transmission and is at "0" during a non-transmission period. At steps S8-3 and S8-4: A known loaded state detecting device which is not shown in FIG. 6 is arranged to detect the presence or absence of the magnetic sheet 10. The output of this detecting device is checked for the presence or absence of the magnetic sheet 10. If the system has not been loaded with the magnetic sheet, a flag IN.FLG is set at "1". Step S8-6. When the flag IN.FLG is in a set state, it indicates that the magnetic sheet 10 has been taken out. In that event, the heads 16A and 16B are repositioned first by temporarily shifting them to the datum points located either in the innermost part or in the outermost part of the magnetic sheet 10.

Steps S8-7 and S8-8: The up switch 68 and the down switch 70 are checked for their on-state. Steps S8-9 and S8-11: The head driving mechanism 19 is caused to shift the heads 16A and 16B in the direction of increasing or decreasing the track number according to whether the up switch 68 is operated or the down switch 70 is operated. Steps S8-10 and S8-12: The track number held within the CPU 88 is incremented or decremented. As regards the reproduction mode, either the field reproduction mode or the frame reproduction mode is then selected according to the position of the mode selection switch 82. Further, with the track number incremented or decremented at the steps S8-10 and S8-12, the display track number data generated by the character generator 42 is changed to renew the track number display of the monitor device 40 accordingly.

Steps S8-13, S8-14 and S8-15: The NTSC encoder 41 is rendered operative or inoperative according to the on- or off-state of the NTSC switch 83. At a next step S8-16: A check is made for the transmission flag TX.FLG. If the flag is found to be at "0" thus indicating a non-transmission state, the flow of operation branches to a step S8-17 and ensuing steps. If the flag is found to be at "1" thus indicating a transmission state, the flow branches out to a step S8-23. At the step S8-17: The transmission start switch 72 is checked to see if it has been pushed. If so, the flow comes to a step S8-18. At the step S8-18: A predetermined signal is stored in the memory circuit 36 according to the reproduction mode determined by the reproduction mode switch 82 and the transmission mode selected by the transmission mode switch 76, 78 or 80. Then, the signal is again stored in the memory depending on the DO number of the image data. The step S8-18 will be described in further detail later. In the case of this embodiment, each of the two field memories M0 and M1 of the memory circuit 36 is arranged to have 640 picture elements in the horizontal direction and 256 horizontal scanning lines. In principle, the memory M0 is arranged to store the luminance signal Y, and the memory M1 is arranged to store the luminance signal or the line sequential chrominance signal R/B.

When the field reproduction is designated by the reproduction mode switch 82, the luminance signal Y is stored in the memory M0. The line sequential chrominance signal R/B is stored in the memory M1 only when the the transmission mode is designated to be the color field mode by the switch 80. When the reproduction mode is the field mode and the reproduced signal is monochromatic with the monochromatic frame mode selected by the switch 78, only one field portion of the luminance signal is stored in the memory M0. If the system is set in the color field transmission mode despite that the actual reproduced signal is monochromatic, the luminance signal Y is solely stored in the memory M0 while nothing is written into the other memory M1. With the frame reproduction mode selected by the reproduction mode switch 82, the signal of the odd number field and that of the even number field are repeatedly reproduced for every field. In the case under discussion, the field portion of signal appearing after the transmission start switch 72 is pushed is taken as an input.

Figure 10A:
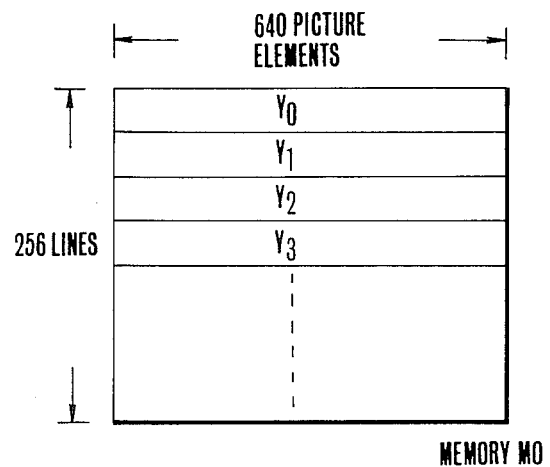
FIGS. 10A(a), 10A(b), 10B(a) and 10B(b) show the data storing, states of a memory circuit shown in FIG. 6.
Figure 10A:
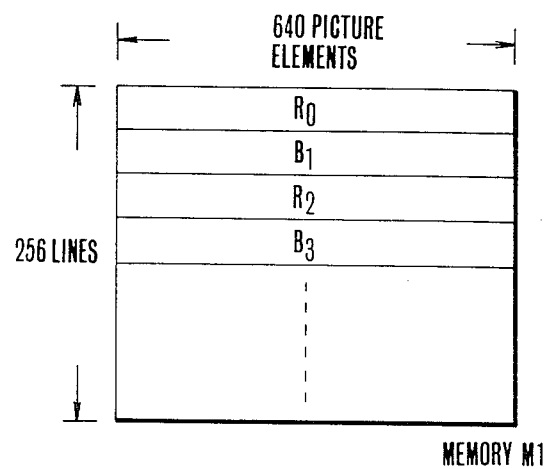
Figure 10B:
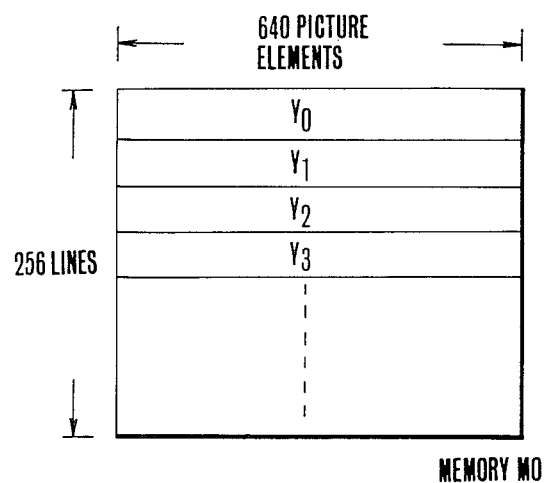
Figure 10B:
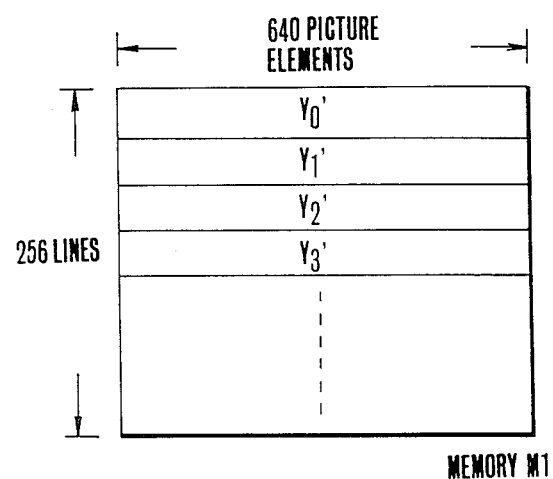

FIGS. 10A($a$), 10A($b$), 10B($a$) and 10B($b$) schematically show the video signal storing states of the field memories M0 and M1. Of these drawings, FIGS. 10A($a$) and 10A($b$) show the memories M0 and M1 as in their states of storing a color field signal; and FIGS. 10B($a$) and 10B($b$) the memories as in the states of storing two field portions of luminance signal included in a frame signal. Further, in storing the video signal in the field memories M0 and M1, the memory control circuit 46 controls in a DMA (direct memory access) manner a memory provided within the CPU 88 for a drop-out flag in accordance with the generating timing of the drop-out signal 32 which is supplied from the reproduced signal processing circuit 87.

Figure 11:
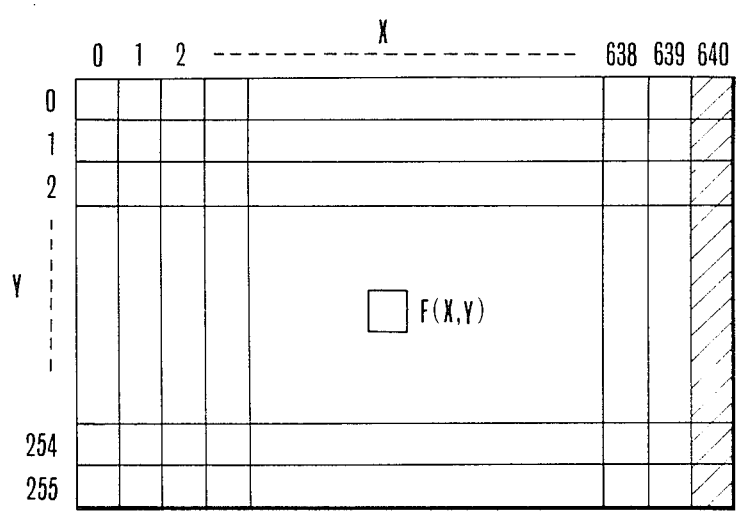
FIG. 11 shows a drop-out flag storing state of the memory of FIG. 6.

FIG. 11 shows the arrangement of the above stated memory provided within the CPU 88 for the drop-out flag. Each of the picture elements constituting the memory circuit 36 has one bit of flag assigned thereto. To increase look-up speed for drop-out positions, there is provided a 640th column as indicated by a hatched part in FIG. 11. In the event of drop-out even only in one part of the line, a flag "1" is set up in the 640th column part of the line. In other words, the memory control circuit 46 is arranged to set the flag "1" at an applicable part in response to the DOP (drop-out pulse) produced from the reproduced signal processing circuit 87 and, at the same time, set the 640th column at "1."

Next, upon completion of the storing action on the memory (memory freeze) and the check for the DO number at the step S8-18, the flow of operation comes to a step S8-25, which is a drop-out compensation routine. In the drop-out compensation routine, the drop-out flag memory which is arranged as shown in FIG. 11 is used. The data of the picture element having the drop-out is replaced, for example, with the data of a picture element located immediately above the drop-out picture element or with the mean value of the data of picture elements located above and below the drop-out picture element.

At a step S8-19: A parameter I for determining whether the transmission mode of sending two field portions of data D0 and D1 is to be selected is initialized. Other, variables are also initialized. When the data D0 is alone to be sent out, the parameter I is set at "0". If the data D0 and D1 are to be sent out, the parameter I is set at "1". Further, a variable i for starting transmission from a first field is cleared and set at "0." The address (X, Y) for reading the field memory data is reset at (0, 0). The symbol X denotes a picture element column number among the columns "0" to "639" aligned in the horizontal direction, and the other symbol Y denotes a picture element line number among the lines "0" to "255" aligned in the vertical direction.

Steps S8-19, S8-20, S8-21 and S8-22: After the initialization of the transmission parameter, the transmission flag TX.FLG is set. The transmission busy LED 84 is either caused to be continuously on or to blink. Then, to start transmission, a flag iRQ.MSK for inhibiting transmission interruption is cleared to permit interruption. The flow then comes back to the step S8-3.

In case that the flag TX.FLG is found to be set thus indicating that the transmission is in progress at the step S8-16, the flow comes to a step S8-23. At the step S8-23, the transmission stop switch 74 is checked to see if it has been pushed. If not, the flow comes to the step S8-3. If so, the flow comes to a step S8-24. At the step S8-24, the inhibiting flag iRQ.MSK is set up to inhibit interruption thereafter. The flow then come back to the step S8-1. Step S8-26: When the power supply is switched off, the flow of operation comes to an end.

Figure 9:
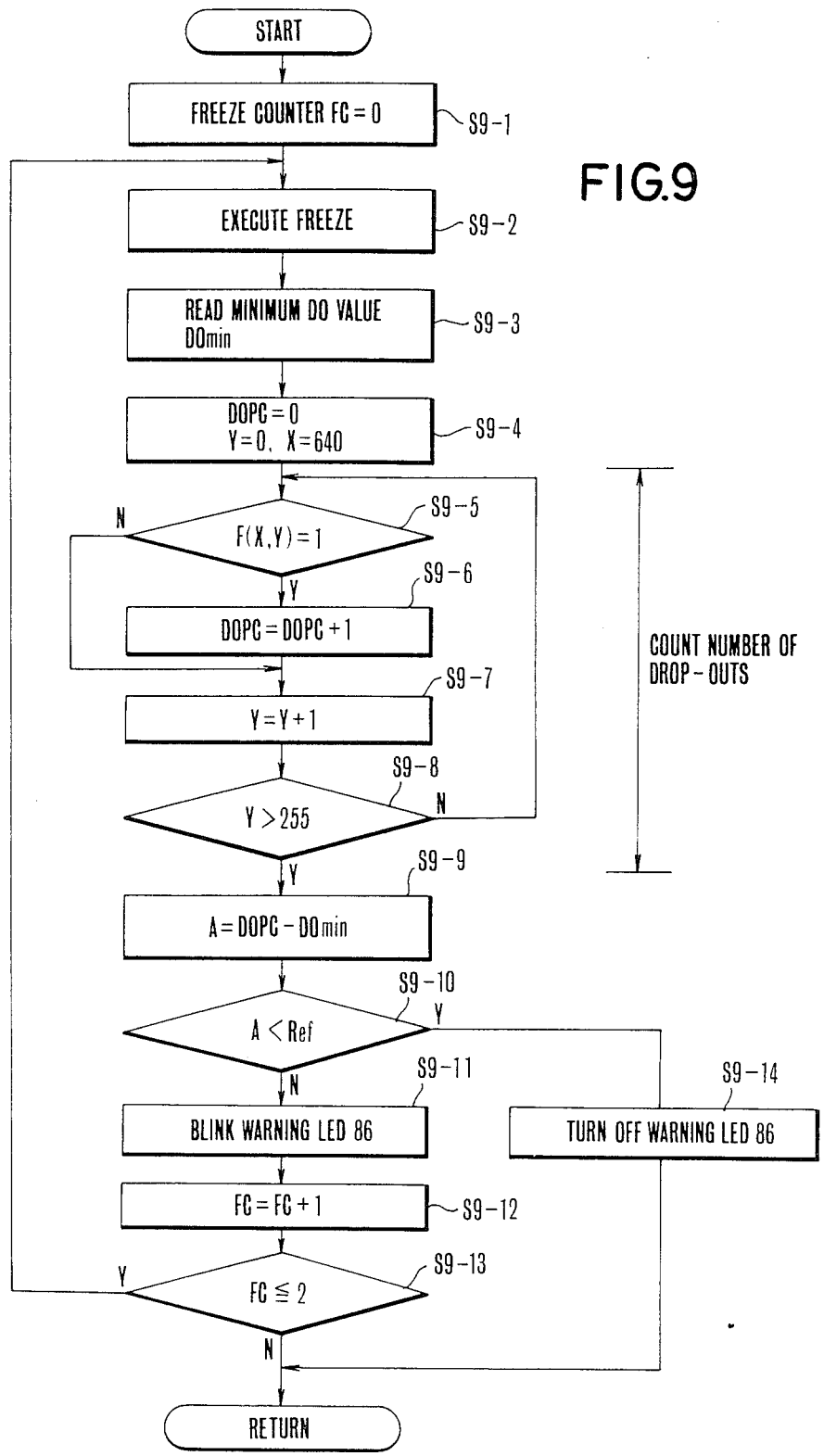
FIG. 9 is a flow chart showing the details of a step S8–18 of the flow chart of FIG. 8B.

FIG. 9 is a flow chart showing the details of the memory freeze and DO number checking routine of the step S8–18 shown in FIG. 8B. At a step S9-1: A variable FC representing the number of freezing times is first set at "0". Step S9-2: Memory freezing is carried out. Step S9-3: The DO number signal from the reproduced signal processing circuit 87 is read out and is substituted for a variable DOmin. Step S9-4: A variable DOPC for counting the number of drop-out lines is set at "0". The horizontal address variable X of the drop-out flag memory is set at "640" and the vertical address variable Y thereof is set at "0". Steps S9-5, S9-6, S9-7 and S9-8: The number of times for which the drop-out flag F(X,Y) becomes "1" is counted for the drop-out line number count variable DOPC until the variable Y reaches "255." Steps S9-9 and S9-10: A check is made for a difference A between the variables DOPC and DOmin. If the difference A is not smaller than a reference value Ref, the signal is unfit for transmission. In that case, therefore, the flow proceeds to a step S9-11. At the step S9-11: The DO warning LED 86 is caused to blink. Step S9-12: Then, the value of the freeze counter FC is incremented. Step S9-2: Again the memory freezing action is performed. In the case of FIG. 9, the memory freezing action is arranged to be repeatable up to three times. Step S9-13: If the DO number of the freeze data is found to be still large after the third memory freezing, the flow returns to the step S8-25 of FIG. 8B. Step S9-10: If the DO number of the freeze data is sufficiently small, the flow comes to a step S9-14 to turn off the warning LED 86 and then returns to the step S8-25 of FIG. 8B.

The drop-out compensated image data which is thus stored at the memory circuit 36 is subjected to a signal processing action to be converted through an interruption process into a transmissible signal form designated by the transmission mode switch 76, 78 or 80. After that, the image data thus processed is supplied to the transmission circuit 64 to be sent out from the output terminal 66 to the transmission line. The above stated transmissible signal form is not directly related to this invention and therefore requires no further description.

Figure 12:
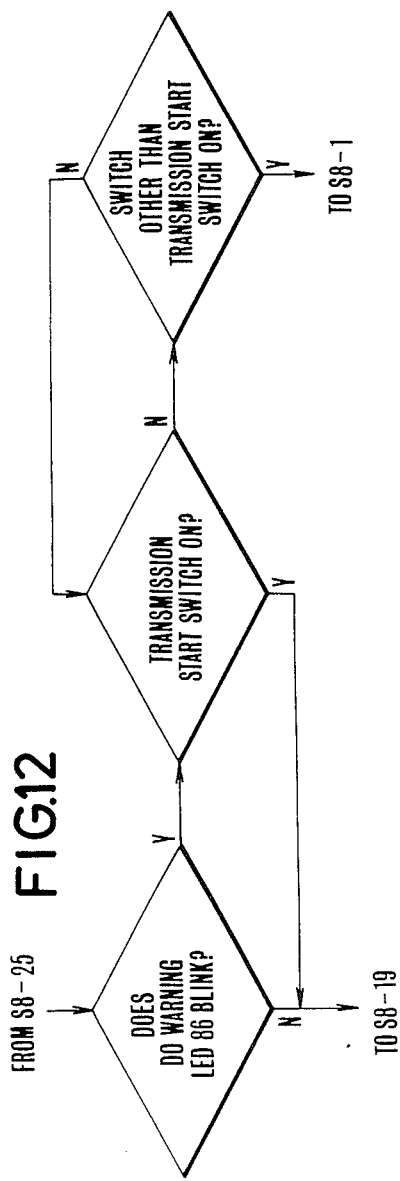
FIG. 12 is a flow chart showing by way of example a modification of the flow of operation shown in FIGS. 8A and 8B.

In the case of the routine of FIGS. 8A and 8B, the transmission is carried out even when the DO number of the freeze data exceeds a given number. However, this problem can be solved by an arrangement as shown in FIG. 12. In the case of FIG. 12, the transmission start switch is checked for confirmation in case that the warning LED 86 is found to be continuously on or blinking at the step S8-18. In other words, if the warning LED 86 is not continuously on nor blinking after the step S8-25, the flow of operation proceeds to the step S8-19 and ensuing steps to permit transmission. In case that the warning LED 86 continuously on or blinking after the step S8-25, the flow proceeds to the steps S8-19, etc. only when reconfirmation is made through the transmission start switch 72. If any switch other than the start switch 72 is pushed, the flow of operation is compulsorily brought back to the step S8-1.

Figure 13:
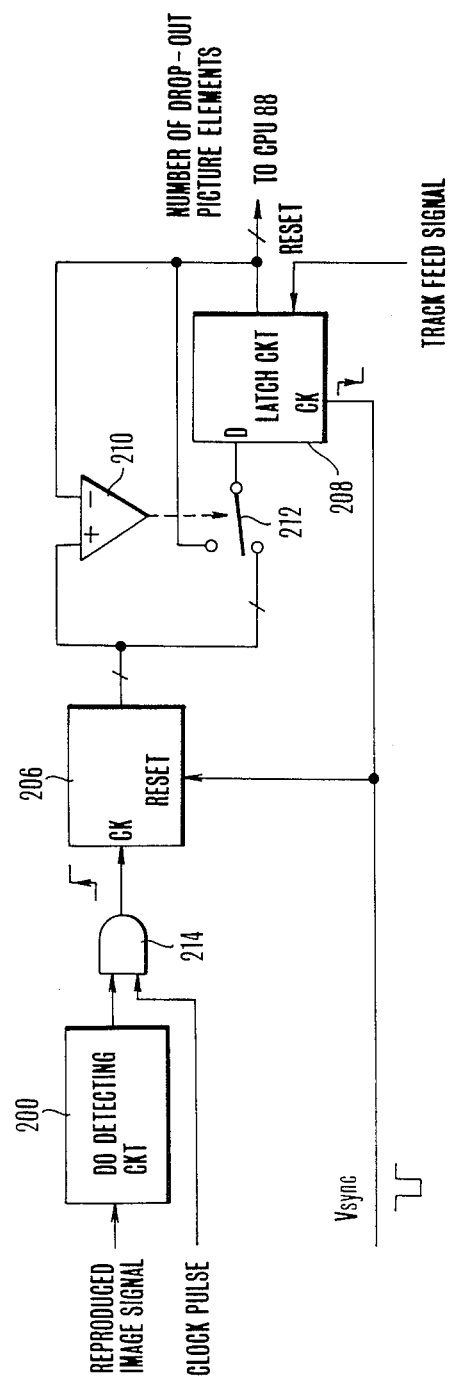
FIGS. 13 and 14 are diagrams showing other examples of the arrangement of the drop-out number detecting circuit of the reproduced signal processing circuit shown in FIG. 6.

FIG. 13 is a circuit diagram showing by way of example a circuit arranged, as a modification of the circuit of FIG. 7, to count the number of picture elements having drop-outs within one picture plane. In FIG. 13, the same components as those of FIG. 7 are indicated by the same reference numerals. In the case of this circuit, an AND gate 214 is arranged to be opened and closed by clock pulses applied in the cycle of sampling the picture element values of the image signal. Meanwhile, a DO detecting circuit 200 is arranged to produce drop-out pulses, which are applied to the clock input terminals of a counter 206 via the AND gate 214. The clock pulses which open and close the AND gate 214 form a signal of the same period as that of the the freeze clock signal applied to the memory circuit 36. In terms of circuit arrangement, the freeze clock pulses produced from a freeze clock signal generating circuit which is not shown are utilized as the clock pulse signals to be applied to the AND gate 214. This circuit arrangement enables a latch circuit 208 to hold the number of drop-out picture elements of the signal recorded on the magnetic sheet 10 and supplies the CPU 88 with information thereon.

In this instance, comparison with the number of drop-outs of the image data stored at the memory circuit 36 is performed by counting, at the counting step (the steps S9-5 to S9-8) of FIG. 9, the number of picture elements having the drop-out flag F (X, Y) at "1."

Further, in order to show the drop-out information like in the cases of the first and second embodiments, this embodiment may be arranged to show it by dividing the horizontal line of the image signal into a plurality of blocks and by arranging flags to indicate the presence or absence of the drop-out within each of these blocks.

Figure 14:
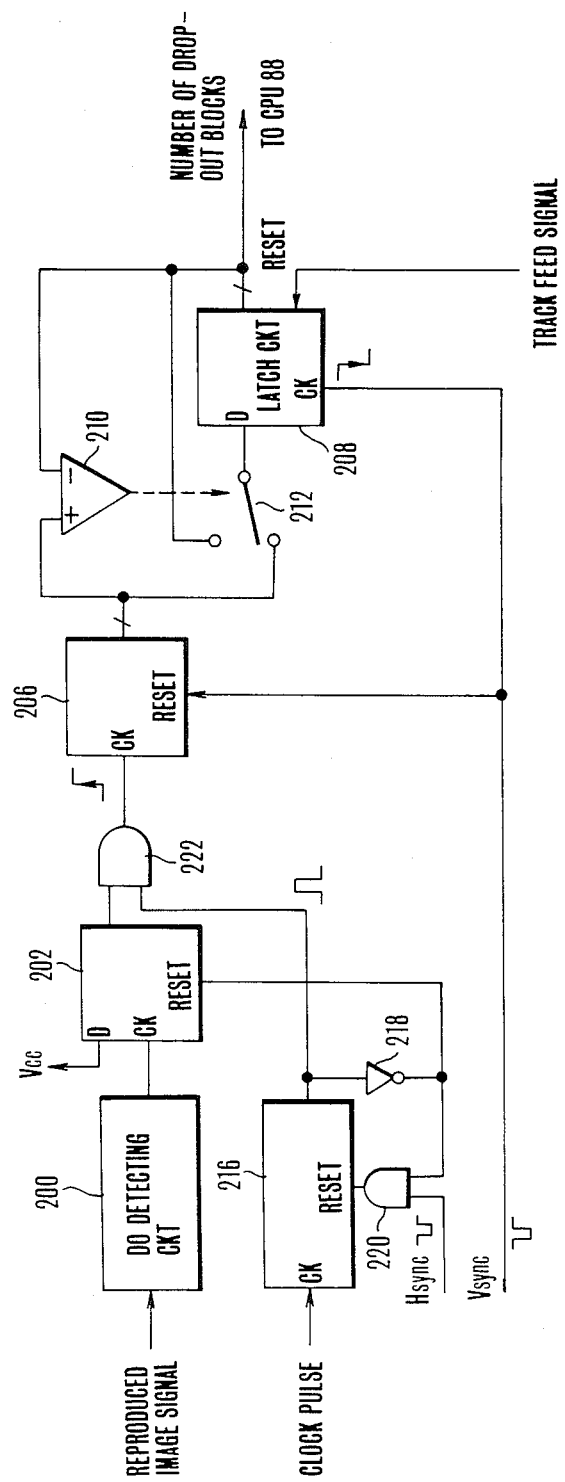

FIG. 14 is a circuit diagram showing another modification of the circuit of FIG. 7. In this case, the horizontal line of the image signal is divided into eight blocks, each consisting of 80 picture elements; and the number of drop-outs is counted and held for each of the eight blocks. In FIG. 14, the same parts as those shown in FIG. 7 are indicated by the same reference numerals and symbols. A counter 216 is arranged to generate a pulse every time the 80 picture elements which constitute one block are counted. A clock pulse signal to be applied to the clock input terminal of the counter 216 is identical with the clock signal applied to the AND gate 214 of FIG. 13. The counter 216 is reset either by a pulse produced by itself or by the horizontal synchronizing pulse signal Hsync. An inverter 218 and an AND gate 220 are arranged according to the direction of these pulses. The output of the inverter 218 is arranged to be applied to the reset input terminal of a D flip-flop 202. An AND gate 222 is arranged to be opened or closed by a pulse produced from the counter 216. The Q output of the D flip-flop 202 is arranged to be applied via the AND gate 222 to the clock input terminal of a counter 206. The counter 206 is arranged to count the rises of the output of the AND gate 222. Assuming that one picture plane consists of 640 picture elements×256 lines, the above stated arrangement enables a latch circuit 208 to hold and supply to the CPU 88 information on a DO number indicative of a number of blocks having drop-outs among the 8×256 blocks.

In the case of FIG. 14, the counting process for the number of drop-outs of the image data stored in the memory circuit 36 means counting the number of blocks in which drop-outs have occurred. In this instance, therefore, a total number of drop-out flag bits that indicate "1" represents the DO number.

In the case of the third embodiment described above, the invention is applied to a still image transmission system. However, the invention is apparently applicable not only to image data handling systems but also to system of other kinds as long as they are storing incoming signals in memories.

Even in cases where the number of drop-outs temporarily or accidentally increases due to dust or the like, the third embodiment of the invention automatically detects it and tries to perform again the storing action on the memory. Therefore, the embodiment is capable of transmitting the image data in the optimum usable state thereof.

What is claimed is:

1. An information signal transmission system for reproducing from a recording medium an information signal recorded on said recording medium and for outputting the reproduced information signal to a transmission line, comprising:
   (a) reproducing means for reproducing from said recording medium an information signal recorded on said recording medium;
   (b) information drop-out detecting means for detecting occurrence or nonoccurrence of an information drop-out in the information signal reproduced by said reproducing means;
   (c) information signal forming means for dividing the information signal reproduced for a given period of time by said reproducing means into an n number (n: an integer which is at least 2) of blocks and, for forming an information drop-out number indicating signal indicative of a number of blocks in which the information drop-out has occurred among said n number of blocks when the occurrence of the information drop-out in the information signal of said given period is detected by said drop-out detecting means;
   (d) holding means for holding the information signal reproduced by said reproducing means; and
   (e) control means for controlling said holding means holding the information signal on the basis of the information drop-out number indicating signal formed by said information signal forming means.

2. A system according to claim 1, wherein said information signal includes an image information signal, and wherein said reproducing means is arranged to repeatedly reproduce one image plane portion of the image information signal recorded on said recording medium.

3. A system according to claim 2, wherein said holding means includes a memory circuit capable of storing one image plane portion of the image information signal reproduced by said reproducing means.

4. A system according to claim 3, wherein said control means is arranged to control said holding means such that, when a value of the information drop-out number indicating signal formed by said information signal forming means is larger than a preset value, one image plane portion of the image signal stored at said memory circuit is rewritten and replaced with another one image plane portion of the image signal newly reproduced by said reproducing means.

5. A system according to claim 4, further comprising display means for making a display when the value of the information drop-out number indicating signal formed by said information signal forming means is larger than said preset value.

6. A system according to claim 4, further comprising:
   (a) interpolation means for interpolating a part having an information drop-out of one image plane portion of said image signal stored at said memory circuit with a part thereof having no information drop-out; and
   (b) transmission means for transmitting to said transmission line said one image plane portion of the image signal interpolated by said interpolation means.

7. A system according to claim 6, further comprising transmission start instructing means for instructing said transmission means to commence transmission, and wherein said transmission means is arranged to begin to transmit said one image plane portion of the image signal interpolated by said interpolation means when said transmission start instructing means instructs for commencement of transmission.

8. A system according to claim 1, further comprising:
   (a) interpolation means for interpolating a part having an information drop-out of the information signal reproduced by said reproducing means with a part thereof having no information drop-out; and
   (b) transmission means for transmitting to said transmission line the information signal interpolated by said interpolation means.

9. A system according to claim 8, wherein said interpolation means is arranged to perform an interpolating action in accordance with the information drop-out number indicating signal formed by said information signal forming means.

10. An image information signal processing device for processing an image information signal upon receipt of said signal, comprising:
    (a) information drop-out detecting means for detecting occurrence or nonoccurrence of an information drop-out in said image information signal;
    (b) information signal forming means for dividing said image information signal received during a given period of time into an n number (n: an integer which is at least 2) of blocks, and for forming an information drop-out part indicating signal indicative of a block in which an information drop-out has occurred among said n number of blocks when the occurrence of said information drop-out is detected by said information drop-out detecting means; and
    (c) storing means for storing said information drop-out part indicating signal formed by said information signal forming means along with said image information signal received during said given period of time.

11. A device according to claim 11, wherein said image information signal includes a still image signal having one image plane formed by a plurality of horizontal scanning lines.

12. A device according to claim 11, wherein said information signal forming means is arranged to divide a portion of said image signal corresponding to one horizontal scanning line, for each image plane portion of said still image signal, into said n number of blocks, to indicate the presence or absence of an information drop-out with one bit for each of said blocks and to form information drop-out part indicating data consisting of the n number of bits for each portion of said image signal corresponding to one horizontal scanning line.

13. A device according to claim 12, wherein said storing means includes a first storing area which is capable of storing one image plane portion of said still image signal for every portion of said image signal corresponding to one horizontal scanning line and a second storing area which is capable of storing the information drop-out part indicating data of the n number of bits for the image signal of each of the horizontal scanning lines forming one image plane in correlation with the image signal stored in said first storing area.

14. A device according to claim 10, further comprising:

(a) fixed image information signal generating means for generating a predetermined fixed image information signal; and
(b) replacing means for substituting said fixed image information signal generated by said fixed image information signal generating means for a part of the received image information signal found by said information drop-out detecting means to have an information drop-out, to produce the image information signal.

15. A device according to claim 14, wherein said storing means includes a first storing area which is arranged to be capable of storing for every predetermined period of time the image information signal produced from said replacing means and a second storing area which is arranged to be capable of storing, in correlation with said image information signal stored in said first storing area, said information drop-out part indicating signal corresponding to each image information signal of said given period of time.

* * * * *

UNITED STATES PATENT AND TRADEMARK OFFICE
CERTIFICATE OF CORRECTION

PATENT NO. : 4,872,066
DATED : October 3, 1989
INVENTOR(S) : Shigeo Yamagata; Masahiro Takei; Tadashi Takayama It is certified that error appears in the above-identified patent and that said Letters Patent is hereby corrected as shown below:

Col. 1, line 30, delete "contrived".

Col. 3, line 2, after "storing" delete ",".

Col. 4, line 26, change "t" to -- to --.

Col. 5, line 54, after "performed" insert -- as --.

Col. 7, line 25, change "a d" to -- and --.

Col. 8, line 8, change "f" to -- of --.

Col. 8, line 67, after "device" insert -- 40 accordingly with --.

Col. 10, line 41, change "the drop-outs the" to -- drop-outs in the --.

Col. 14, line 1, after "86" insert -- is --.

Col. 15, line 13, change "system" to -- systems --.

Col. 16, line 60, change "11" to -- 10 --.

Signed and Sealed this

Eleventh Day of September, 1990

Attest:

HARRY F. MANBECK, JR.

*Attesting Officer*   Commissioner of Patents and Trademarks